UNITED STATES PATENT OFFICE.

THOMAS W. BETHEL, OF BROOKLYN, NEW YORK.

IMPROVEMENT IN MEDICAL COMPOUNDS FOR CONSUMPTION, &c.

Specification forming part of Letters Patent No. 119,301, dated September 26, 1871.

*To all whom it may concern:*

Be it known that I, THOMAS W. BETHEL, of Brooklyn, in the county of Kings and State of New York, have invented a new and Improved Medical Compound; and I do hereby declare the following to be a full, clear, and exact description thereof, which will enable those skilled in the art to make and use the same.

This invention relates to a compound prepared from the root of a tropical plant which grows abundantly in the West India Islands, and which is known by the name of rat-root or brake-root; said compound being of particular use for persons afflicted with consumption, lung or throat diseases. The rat or brake-root has a strong earthy smell, and its taste is exceedingly sickening and nauseous, and the tree, of which the root is a part, grows about eight feet high and spreads out considerably, bearing annually a little round white mealy berry, which is an excellent diet for fowls.

In preparing my compound I take rat-root, four (4) ounces; water, seven (7) ounces; alcohol, nine (9) ounces. The root, before being put in the liquid, is ground or otherwise reduced to fine particles, and after having been introduced into the liquid it is left standing for about seven days. The liquid is then separated from the solid parts by means of a filter or otherwise, and the tincture thus obtained possesses all the required qualities. But in order to destroy its sickening flavor and to dilute it still more I add to said tincture its bulk in sirup tolu or in simple sirup. When thus prepared my medicine is ready for use.

I do not wish to confine myself to the precise method above described for producing an extract from rat-root, since other methods could be employed without materially changing the result.

The usual dose is one teaspoonful three times a day, and when regularly taken it proves an excellent remedy against consumption and against all lung and throat diseases.

What I claim as new, and desire to secure by Letters Patent, is—

A medical compound prepared of the ingredients and substantially in the manner herein set forth.

This specification signed by me this 5th day of September, 1871.

THOMAS W. BETHEL.

Witnesses:
W. HAUFF,
C. WAHLERS.                                   (29)